(12) United States Patent
Hohmann, Jr.

(10) Patent No.: US 10,968,638 B1
(45) Date of Patent: Apr. 6, 2021

(54) SYSTEMS AND METHODS FOR AN INSULATED THERMAL WALL ANCHOR

(71) Applicant: Ronald Hohmann, Jr., Parkland, FL (US)

(72) Inventor: Ronald Hohmann, Jr., Parkland, FL (US)

( * ) Notice: Subject to any disclaimer, the term of this patent is extended or adjusted under 35 U.S.C. 154(b) by 0 days.

(21) Appl. No.: 16/745,046

(22) Filed: Jan. 16, 2020

(51) Int. Cl.
*E04F 13/08* (2006.01)
*E04F 13/00* (2006.01)

(52) U.S. Cl.
CPC ............................... *E04F 13/0833* (2013.01)

(58) Field of Classification Search
CPC .................................................. E04F 13/0833
USPC ...................................................... 52/782.1
See application file for complete search history.

(56) References Cited

U.S. PATENT DOCUMENTS

| | | | | |
|---|---|---|---|---|
| 3,944,008 | A * | 3/1976 | Moore | B62D 29/00 180/21 |
| 4,041,834 | A * | 8/1977 | Herkes | F16B 23/0023 411/82.2 |
| 4,497,418 | A * | 2/1985 | Nunlist | F16B 43/001 220/234 |
| 4,700,527 | A * | 10/1987 | Pardo | E04B 2/12 52/772 |
| 4,764,069 | A * | 8/1988 | Reinwall | B25B 13/5091 411/397 |
| 4,976,081 | A * | 12/1990 | Litzenberger | E04C 2/292 52/309.11 |
| 5,260,100 | A * | 11/1993 | Day | B05D 3/0426 427/386 |
| 5,323,578 | A * | 6/1994 | Chagnon | E04B 2/8647 52/426 |
| 5,626,451 | A * | 5/1997 | Seibert | E04D 3/3603 411/368 |
| 5,924,256 | A * | 7/1999 | Ito | E04F 13/0814 52/243 |
| 6,128,883 | A * | 10/2000 | Hatzinikolas | E04B 1/4178 52/378 |
| 6,250,036 | B1 * | 6/2001 | Nurley | E04D 3/3606 52/408 |
| 6,350,092 | B1 * | 2/2002 | Powell | F16B 13/141 312/263 |

(Continued)

FOREIGN PATENT DOCUMENTS

EP             2133487 A2 * 12/2009 ............. E04F 13/12

*Primary Examiner* — Patrick J Maestri
*Assistant Examiner* — Joseph J. Sadlon
(74) *Attorney, Agent, or Firm* — Derek Fahey; The Plus IP Firm

(57) ABSTRACT

A wall anchor for use in a cavity wall configured to connect to a veneer tie that joins an inner wythe, and an outer wythe of the cavity wall is disclosed. The wall anchor includes an elongated shaft having a first longitudinal axis, a fastening end section, a receiving end section, and a middle section. The wall anchor system further includes a panel including an interior positioned between at least two end surfaces, and a first insulating member spanning at least a portion of the interior of the panel. The receiving end section of the wall anchor system includes apertures defining an aperture wall for accepting sections of the veneer tie. The wall anchor system further includes a plurality of insulating members covering the aperture wall configured to reduce the transfer of thermal energy by the veneer tie between the inner wythe and the outer wythe.

13 Claims, 8 Drawing Sheets

(56) References Cited

U.S. PATENT DOCUMENTS

| | | | | |
|---|---|---|---|---|
| 6,792,722 B2 | * | 9/2004 | Beser | F24F 3/0442 |
| | | | | 52/309.4 |
| 6,973,756 B2 | | 12/2005 | Hatzinikolas | |
| 7,415,803 B2 | | 8/2008 | Bronner | |
| 7,797,902 B2 | * | 9/2010 | Hikai | E04F 13/0833 |
| | | | | 52/506.05 |
| 8,109,706 B2 | * | 2/2012 | Richards | F16B 25/0094 |
| | | | | 411/378 |
| 8,176,696 B2 | * | 5/2012 | LeBlang | E04B 1/165 |
| | | | | 52/309.12 |
| 8,312,683 B2 | * | 11/2012 | Tadros | E04C 2/044 |
| | | | | 52/309.11 |
| 8,454,290 B2 | * | 6/2013 | Schaser | F16B 43/001 |
| | | | | 411/544 |
| 8,677,712 B1 | * | 3/2014 | Edmonds, Jr. | E04F 15/147 |
| | | | | 52/573.1 |
| D702,544 S | | 4/2014 | Hohmann, Jr. | |
| 8,683,765 B2 | * | 4/2014 | Hillers | H05K 9/0003 |
| | | | | 52/309.4 |
| 8,720,146 B2 | * | 5/2014 | Wang | F27D 1/14 |
| | | | | 52/506.02 |
| 8,726,597 B2 | | 5/2014 | Hohmann, Jr. | |
| 8,826,624 B2 | * | 9/2014 | Dalen | F16B 13/141 |
| | | | | 312/263 |
| 8,839,842 B2 | * | 9/2014 | Ashelin | E06B 9/13 |
| | | | | 160/330 |
| 8,863,469 B2 | * | 10/2014 | Curtis | E04B 1/40 |
| | | | | 52/712 |
| 8,893,452 B2 | | 11/2014 | Hatzinikolas | |
| 8,938,921 B2 | * | 1/2015 | Hartman | E04C 2/525 |
| | | | | 52/200 |
| 8,984,837 B2 | * | 3/2015 | Curtis | E04B 2/44 |
| | | | | 52/565 |
| 9,140,001 B1 | | 9/2015 | Hohmann, Jr. | |
| 9,273,461 B1 | | 3/2016 | Hohmann, Jr. | |
| 9,366,030 B2 | * | 6/2016 | Spear | E04C 2/34 |
| 9,512,621 B1 | * | 12/2016 | Trezza | E04B 2/56 |
| 9,567,752 B2 | * | 2/2017 | McCandless | E04F 13/16 |
| 9,803,355 B1 | | 10/2017 | Ripley et al. | |
| 9,945,414 B1 | | 4/2018 | Rodenhouse et al. | |
| 10,202,754 B2 | | 2/2019 | Hohmann, Jr. | |
| 10,221,563 B2 | * | 3/2019 | Miks | E04B 2/562 |
| 10,228,007 B2 | * | 3/2019 | Gyurkovics, Jr. | E04F 13/0832 |
| 10,273,686 B2 | * | 4/2019 | Lake | E04F 13/0805 |
| D848,250 S | | 5/2019 | Ripley et al. | |
| 10,428,520 B2 | * | 10/2019 | Lake | E04B 1/7612 |
| 2004/0055236 A1 | * | 3/2004 | Keith | E04B 1/4178 |
| | | | | 52/410 |
| 2009/0071078 A1 | * | 3/2009 | Rakow | F16B 33/06 |
| | | | | 52/1 |
| 2009/0133357 A1 | * | 5/2009 | Richards | F16B 25/0094 |
| | | | | 52/698 |
| 2011/0107723 A1 | * | 5/2011 | Hurlburt | B32B 29/00 |
| | | | | 52/794.1 |
| 2015/0121792 A1 | * | 5/2015 | Spoo | E04B 1/40 |
| | | | | 52/483.1 |

* cited by examiner

SYSTEMS AND METHODS FOR AN INSULATED THERMAL WALL ANCHOR

CROSS-REFERENCE TO RELATED APPLICATIONS

Not applicable.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

TECHNICAL FIELD

The present invention relates to anchoring systems for insulated cavity walls, and more specifically, an insulated thermal wall anchor that creates a thermal break in a cavity wall.

BACKGROUND

Historically, geographic locations that endure subarctic climates have had to bear the burden of capitalizing on comfort and energy efficiency when relating to the heating and cooling of building structures. For example, when an interior of a building surface is thoroughly heated, the goal is to prevent the release of the interior heat due to the cold associated with the exterior of the heated structure. A common approach used to tackle this burden is to use anchoring systems, composed mainly of metal components, for cavity walls in order to secure veneer facings to building structures resulting in a reduction of impact and subsequent issues relating to microbursts, temperature inversions, or surface obstructions. These anchoring systems have been applied to masonry backup walls configured to provide wire to wire connections on the veneer side. Current anchoring systems provide an insulating effect and an in-cavity thermal break; thus, resulting in the severing of thermal pathways created from metal-to-metal contact of anchoring system components.

However, a common issue with this approach is that the temperature of the wall is high due to the drop in temperature that takes place outside of the insulating components associated with the system. Another common issue is that the minimized heat transferred through the walls is not efficiently maintained due to the location and configuration of insulating components on the wall anchors. For example, if components of the anchoring system are not isolated, then thermal breaks are minimal, resulting in a buildup of condensation within the cavity wall structure. This failure to isolate various components of the anchoring system also reduces the overall amount of heat preserved by the system. Furthermore, the configuration of modern wall anchors does not account for various configurations that allow for consistent preservation of energy via multiple insulating components disposed throughout the anchoring system, much less account for multiple insulation hubs configured to integrate within the wall anchor itself. As a result, there exists a need for improvements over the prior art and, more particularly, for a more efficient way to preserve thermal energy transfers and reduce the loss of heat from building structures enduring subarctic climates via insulated wall anchors.

SUMMARY

An insulated thermal wall anchor is disclosed. This Summary is provided to introduce a selection of disclosed concepts in a simplified form that are further described below in the Detailed Description, including the drawings provided. This Summary is not intended to identify key features or essential features of the claimed subject matter. Nor is this Summary intended to be used to limit the claimed subject matter's scope.

In one embodiment, a wall anchor for use in a cavity wall configured to connect to a veneer tie that joins an inner wythe, and an outer wythe of the cavity wall is disclosed. The wall anchor includes an elongated shaft having a first longitudinal axis, a fastening end section, a receiving end section, and a middle section between the fastening end section and the receiving end section. The fastening end section is configured to be threadedly mounted to an inner wythe of the cavity wall, and the receiving end section is configured to have at least one aperture wall for accepting at least one section of the veneer tie. The wall anchor further includes a panel having an interior positioned between at least two end surfaces, and a first insulating member spanning at least a portion of the interior of the panel. The receiving end section of the wall anchor system includes at least one aperture defining an aperture wall for accepting at least one section of the veneer tie. The wall anchor system further includes at least a second insulating member covering the aperture wall. The first and second insulating members reduce the transfer of thermal energy by the veneer tie between the inner wythe and the outer wythe.

In one embodiment, the fastening end section of the elongated shaft includes a threaded shaft section, and a tubular section having an open end having a threaded wall section configured to mate with the threaded shaft allowing the first insulating member to function as at least a first thermal coating that is configured such that the first thermal coating spans a section of the interior of the panel.

In one embodiment, the wall anchor system includes one or more sections of a thermal coating disposed along the elongated shaft configured to define a third insulating member to engage at least a portion of a stud abutting one of the surfaces of the panel.

In one embodiment, the receiving end section further defines a wing-body, including a plurality of planar wings. The wing-body has a wing extending outward from each side of the first longitudinal axis. The plurality of planar wings, each including at least one aperture, the second insulating member disposed of thereon. The at least one aperture includes an aperture wall configured to be covered by the second insulating member defining a thermal break between the veneer tie that joins the inner wythe and the outer wythe of the cavity wall. In another embodiment, the receiving end section further defines a second threaded shaft section for receiving a wing-body, including a channel having a second threaded wall section for being received by the second threaded shaft section.

In one embodiment, the receiving end section further includes a catching feature configured to receive a tool configured to threadedly mount the wall anchor to the inner wythe and a flanged section positioned downward from the aperture.

In one embodiment, the threaded section for receiving the wing-body is configured to support an orientation where the plurality of planar wings extend outward from the first and second sides of the first longitudinal axis. In an embodiment, the receiving end includes a non-threaded section for receiving the wing-body in which the non-threaded section may be affixed via nuts, bolts, nails, or any other applicable type of fastening mechanism configured to affix the winged body to any applicable end of the wall anchor.

As described herein, an insulating member may be any material, solid, or other applicable matter configured to impede the free flow of electrons from atom to atom and molecule to molecule in order to prevent the charge from being transferred from one or more conductive objects to its surroundings. An insulating member may include thermal coatings or sections associated with thermal coatings disposed throughout the system in order to assist in the goal of reducing thermal energy transfers.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

Like reference numerals refer to like parts throughout the several views of the drawings.

DETAILED DESCRIPTION

Figure 1:
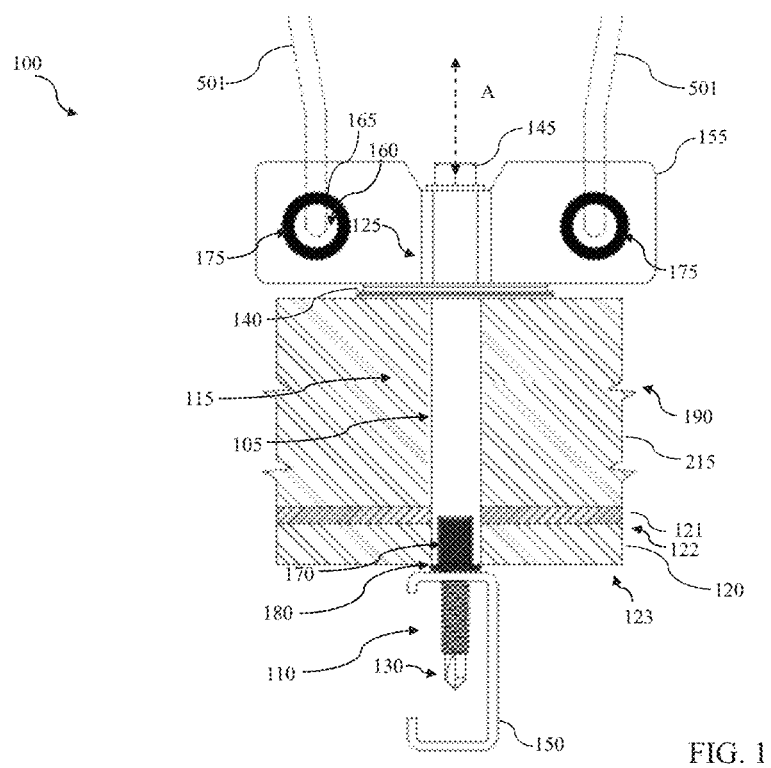
FIG. 1 is a cross-sectional view of a wall anchoring system attached to a panel, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing an anchoring system including at least one aperture and supporting insulating members configured to reduce the transfer of thermal energy by the veneer tie between the inner wythe and outer wythe. For example, the present embodiments improve over the prior art by providing a thermal barrier within the outward and inward-facing surfaces of the panel. Additionally, the present embodiments improve over the prior art by providing a thermal break between the strut and the fastening end of the wall anchor. The combination of the aforementioned along with a catching feature, flanged section, and various embodiments allow reduction of energy transfer along the entire wall anchor resulting in thermal energy being retained in a building structure as opposed to merely a section of the wall anchor associated with a thermal spacer resulting in thermal energy being consistently transferred outside of said structure. The anchoring system is provided in a singular receiving end embodiment, including an aperture comprising insulating functionality, a threaded bi-winged embodiment comprising insulating functionality, and a non-threaded bi-winged embodiment comprising insulating functionality.

Figure 5:
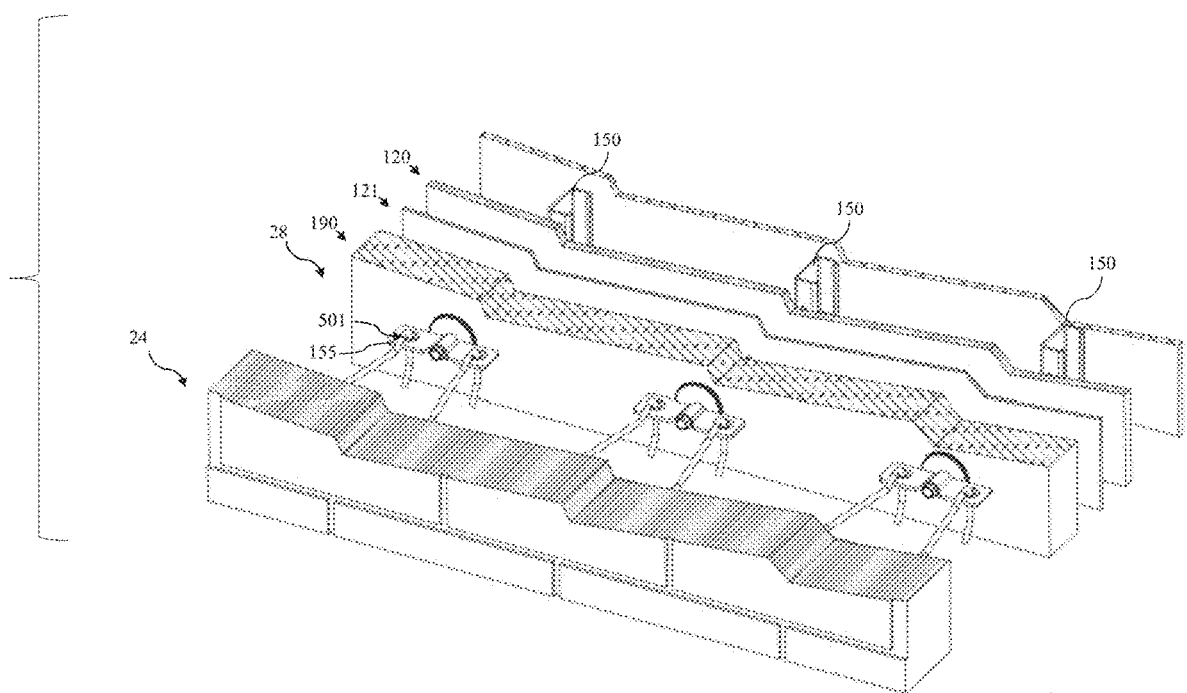

Referring now to FIG. 1, a perspective view is shown of a wall anchor system 100, according to one embodiment. The wall anchor system is to be applied to a cavity wall between an inner wythe and outer wythe. FIG. 5 is a perspective view of an anchoring system as applied to a cavity wall with an inner wythe of drywall construction and on outer wythe of brick, according to an example embodiment. FIG. 5 illustrates the wall anchor having a winged body with a veneer tie 501 attached to apertures within the receiving end of the wall anchor. However, it is understood that other types of receiving ends may be used and are within the spirit and scope of the present invention. In the present invention, the outer wythe is brick. However, other types of outer wythes may be used and are within the spirit and scope of the present invention. As illustrated in FIGS. 1 and 5, the wall anchor may be used in connection with an insulation barrier 190 and an air vapor barrier 121. However, in other embodiments, such barriers and membranes may not be used.

The wall anchor system 100 may include an elongated shaft 105, including a fastening end 110, a middle section 115, and a receiving end 125. The elongated shaft 105 may be affixed to the fastening end 110 via screws, nuts, bolts, or any other applicable fasteners configured to endure extreme pressures and temperatures. In one embodiment, elongated shaft 105 and the ends may be a plurality of integrated shafts configured to be housed and arranged in a nested-like structure. In one embodiment, the wall anchor system 100 may further include a panel 120 approximately positioned between fastening end 110 and middle section 115. Components of the wall anchor system 100 may be comprised of a material such as carbon steel, stainless steel, aluminum, titanium, other metals or alloys, composites, ceramics, polymeric materials such as polycarbonates, such as Acrylonitrile butadiene styrene (ABS plastic), Lexan™, and Makrolon™. The components may be formed from a single piece or from several individual pieces joined or coupled together. The components may be manufactured from a variety of different processes, including an extrusion process, a mold, welding, shearing, punching welding, folding, etc.

In one embodiment, the system 100 further includes at least one wing 155 affixed to receiving end 125, wherein the at least one wing 155 includes at least one aperture 160 configured to receive at least one section of the veneer tie 501. In certain embodiments, the system may consist of only one aperture 160 in the receiving end for mounting a portion of the veneer tie. In other embodiments, the system 100 may include a plurality of apertures 160 configured to include a second insulating member 175 and wherein each aperture includes an aperture wall 165 having a second insulating member 175 disposed on the aperture walls and configured to assist in accepting the veneer tie. In certain embodiments, each second insulating member of thermal coating is configured to coat the entire aperture wall to prevent the transfer of energy between the veneer tie 501 that is to insert into each aperture. Each second insulating member is configured to provide a thermal break between the veneer tie 501 and the winged body 155 or receiving end of the wall anchor. FIGS. 1-5 only illustrate a receiving end with a wing-body having two apertures; however, it is understood that other types of receiving ends having one aperture may be used and are within the spirit and scope of the present invention.

Figure 2A:
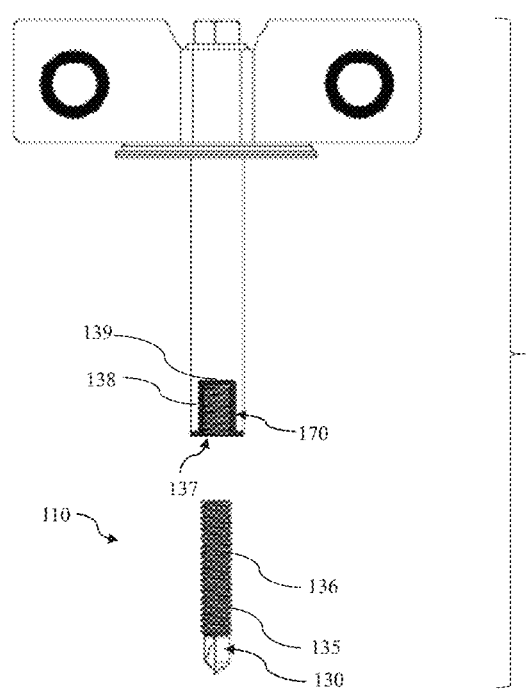
FIG. 2A illustrates a cross-sectional view of the wall anchor with an insulating element in a first configuration in a disassembled configuration, according to an example embodiment.
Figure 2B:
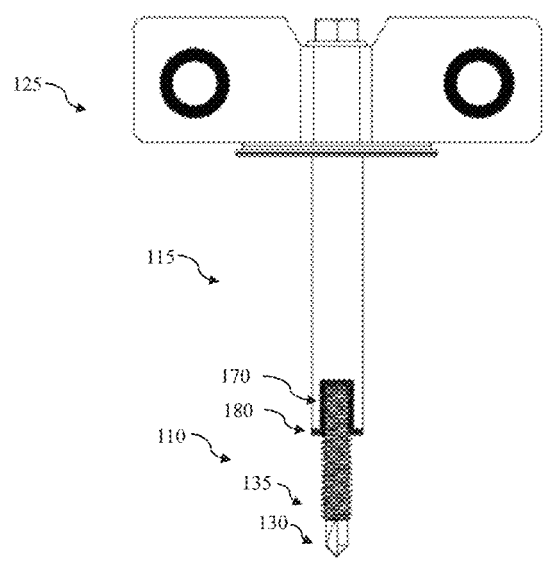
FIG. 2B illustrates a cross-sectional view of the wall anchor with an insulating element in the first configuration in an assembled configuration, according to an example embodiment.
Figure 2C:
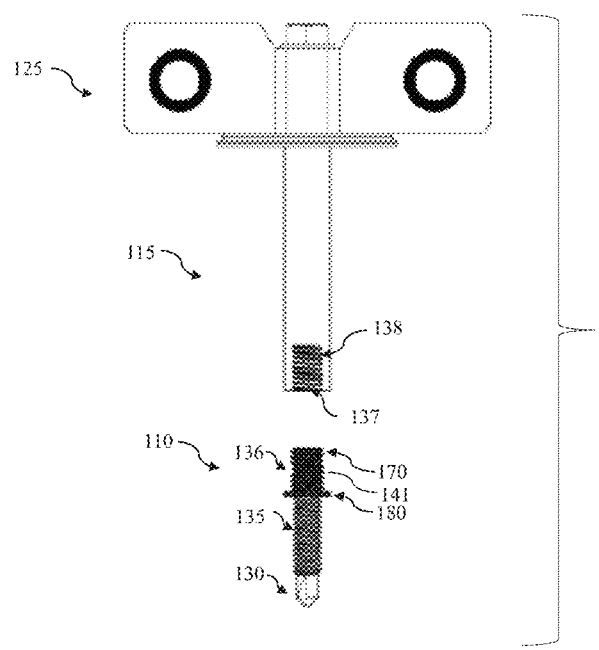
FIG. 2C illustrates a cross-sectional view of the wall anchor with an insulating element in a second configuration in a disassembled configuration, according to an example embodiment.
Figure 2D:
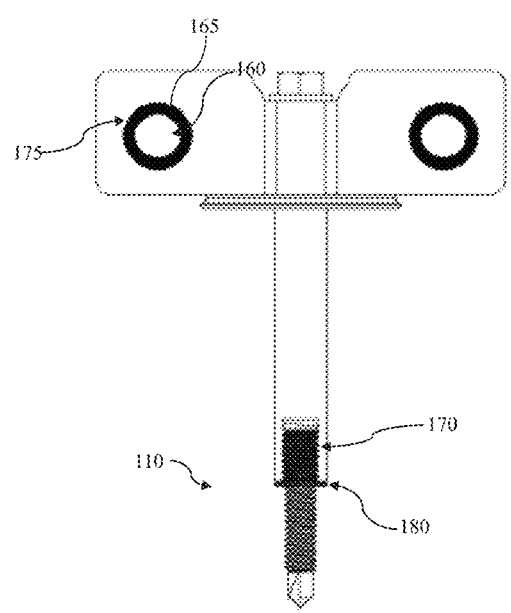
FIG. 2D illustrates a cross-sectional view of the wall anchor with an insulating element in the second configuration in an assembled configuration, according to an example embodiment.
Figure 3:
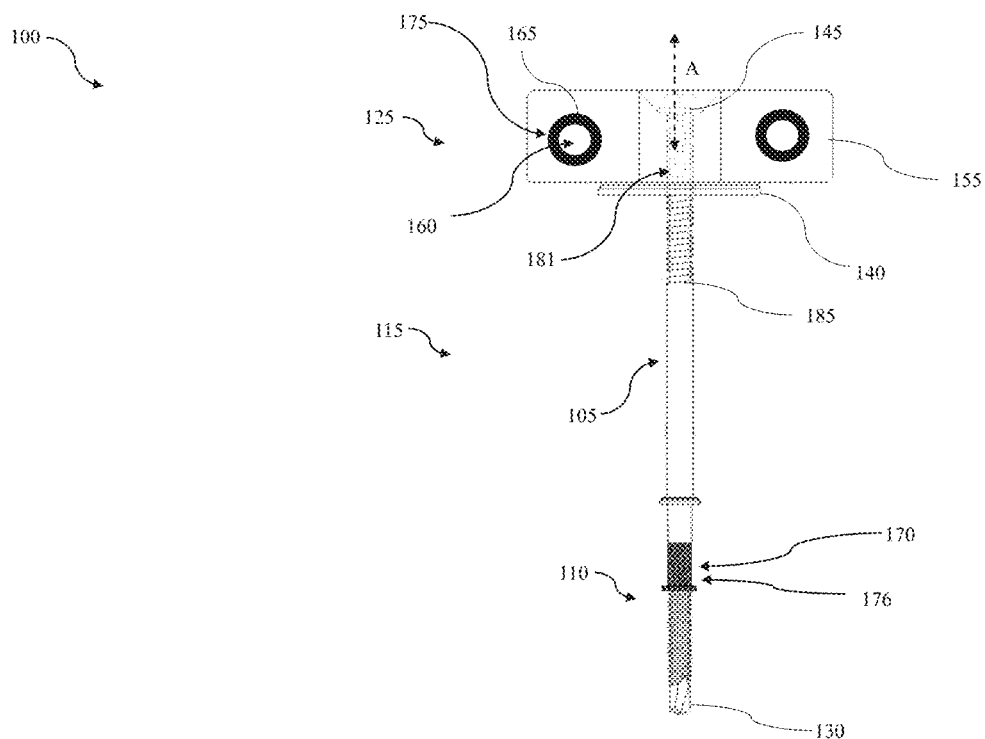
FIG. 3 is a second perspective view of the wall anchoring system including a bi-winged configuration, according to an example embodiment.

In one embodiment, the system 100 may be composed of a winged body configuration, including a plurality of wings 155 (as depicted in FIGS. 1-3), which are configured to be detached from elongated shaft 105, receiving end 125, and/or both. The affixing of the plurality of wings 155 may be accomplished by a non-threaded mechanism. However, in other embodiments, as illustrated in FIG. 3, the elongated shaft 105 may include a threaded section 185 that is configured to be threadedly attached to a channel 181 having a mating threaded channel wall. In operation, the threaded section 185 may be threadedly mated and attached to the threaded walls of the channel so that the insulating member 175 is disposed of offset from the longitudinal axis of the shaft of the system.

Referring to FIGS. 1-3, in one embodiment, the system includes an insulating member that is configured to span at least an interior portion 215 of the panel 120. In one of my embodiment (see FIG. 1), the panel may be a panel of drywall or sheetrock having an inward-facing surface 122 and an outward-facing surface 123. The insulating member may also span a portion of weatherproofing membrane 121 positioned outside or outward from the outward-facing surface of the panel. In one embodiment, the system may also include an third insulating member 180 that is configured to span across a portion of the stud 150 that abuts the inward-facing surface 122 of the panel or drywall so that the insulating member provides a thermal break preventing or reducing thermal energy from transferring from the stud to the elongated shaft. The insulating members 170, 175, 180, alone or together, are configured to provide a thermal break in the cavity wall between the elongated body and a veneer tie attached to the elongated body. The thermal breaks also are configured to provide thermal brakes between the veneer tie and other portions of the system, including the interior portion of the wallboard or panel 120 and the stud 150.

FIG. 2A illustrates a cross-sectional view of the wall anchor with an insulating element 170 in a first configuration in a disassembled configuration, according to an example embodiment. FIG. 2B illustrates a cross-sectional view of the wall anchor with the insulating element in the first configuration in an assembled configuration, according to a sample embodiment. FIG. 2C illustrates a cross-sectional view of the wall anchor with an insulating element in a second configuration in a disassembled configuration, according to an example embodiment. FIG. 2D illustrates a cross-sectional view of the wall anchor with an insulating element in the second configuration in an assembled configuration, according to an example embodiment. In both of the embodiments (first configuration and second configuration) illustrated in FIGS. 2A-2D, the fastening end 110 includes a threaded shaft section 135 and a tubular section. The tubular section has an open end 137, a threaded wall section 138 within the tubular wall section configured to mate with the threaded shaft section 135. In one embodiment, a thermal coating or third insulating member 180 is configured to provide a barrier that spans a portion of the threaded shaft. The insulating element is configured to come into contact with an applicable surface such as stud 150 that abuts inward-facing surface 122 of the panel.

In both of the embodiments (first configuration and second configuration) illustrated in FIGS. 2A-2D, a thermal coating or third insulating member 180, is configured to engage at least a portion of stud 150 such that the end of the elongated shaft 105 does engage the stud. In the first configuration illustrated in FIGS. 2A-2B, third insulating member 180 is configured to be disposed at the end of the elongated shaft 105 such that the third insulating member extends beyond the end of the elongated shaft. The thermal coating or third insulating member 180 is configured to provide a thermal barrier that engages with stud 150 and prevents the inward-facing surface 123 of the panel or end of the elongated shaft 105 from engaging the stud. The thermal barrier provides an insulating effect and an in-cavity thermal break; thus, resulting in the severing of thermal pathways.

In the second configuration, illustrated in FIGS. 2C-2D, the first insulating member 170 is configured such that the insulating member spans from at least a portion of the interior 215 of the panel 120 (see FIG. 1), and spans beyond the outward and inward-facing surfaces of the panel 120. Additionally, the third insulating member 180 when fully assembled and attached with the stud 150, the third insulating member 180 is configured to engage the stud 150 such that the stud does not contact the inward-facing surface 123 of the panel or the end of the elongated shaft. The thermal barrier provides an insulating effect and an in-cavity thermal break; thus, resulting in the severing of thermal pathways.

In both embodiments (first configuration and second configuration) illustrated in FIGS. 2A-2D, the third insulating member 180 may be configured to have a larger diameter than the outside cross-sectional diameter of the end of the elongated shaft 105. The size or width of the third insulating member may vary depending on the application of any other factors. Additionally, the height of the third insulating member may be varied such that it is larger so that a larger dimension between the end of the elongated shaft 105 and the stud 150 can be increased. Additionally, other embodiments may be used within the spirit and scope of the present invention.

In the first configuration illustrated in FIGS. 2A-2B, the size or width of the third insulating member 180 may be configured to have a larger diameter than the outside cross-sectional diameter of the end of the elongated shaft 105. Additionally, the height or thickness of the third insulating member may be configured to have an equal height or thickness to the first insulating member 170 which spans from at least a portion of the interior 215 of the panel 120 (see FIG. 1) so that there could be an equal dimension between first insulating member 170 and the third insulating member 180 which abuts the stud 150 outward-facing surface 123.

In the second configuration, illustrated in FIGS. 2C-2D, the size or width of the third insulating member 180 may be configured to have a larger diameter than the outside cross-sectional diameter of the end of the elongated shaft 105. Additionally, the height or thickness of the third insulating member may be configured to have a larger height so that a larger dimension between the end of the elongated shaft 105 and the stud 150 which abuts the outward-facing surface 122 of panel 120. However, in other embodiments, other sizes may be used in are configured to be within the spirit of scope of the present invention.

Additionally, in certain embodiments, the thickness of the first insulating member and second insulating member may be varied depending on the size of the threaded shaft 135 as well as other factors, such as temperature, building material, as well as a variety of other parameters.

In the embodiments illustrated in FIG. 2A-2B, the threaded wall section 138 of the tubular section includes a thermal coating 139 that is configured to receive the threaded portion 135 of the threaded shaft section. In the embodiments illustrated in FIGS. 2A-2B, when the system is fully assembled and mounted to the wallboard or panel 120, the insulating member 170 is configured such that the insulating member 170 spans from at least a portion of the interior 215 of the panel 120 (see FIG. 1). In certain embodiments, the first insulating member spans beyond the outward-facing surface 123 and inward-facing surface 122 of the panel 120. Additionally, as illustrated in FIG. 1, when fully assembled and attached with the stud 150, the third insulating member 180 may span the entire stud 150. Insulating members 170, 180 reduce the transfer of thermal energy by the veneer tie between the inner wythe and the outer wythe.

In the embodiments illustrated in FIG. 2C-2D the threaded wall section 138 of the tubular section has no thermal coating but is configured to receive the threaded portion 135 of the threaded shaft section having a thermal coating 141. In the embodiments illustrated in FIGS. 2C-2D, when the system is fully assembled and mounted to the wallboard, the insulating member 170 is configured such that the insulating member spans from at least a portion of the interior 215 of the panel 120 (see FIG. 1). In certain embodiments, the first insulating member spans beyond the outward and inward-facing surfaces of the panel 120. Additionally, as illustrated in FIG. 1, when fully assembled and attached with the stud 150, the insulating member 180 is configured to engage the stud 150. Insulating members 170, 180 reduce the transfer of thermal energy by the veneer tie between the inner wythe and the outer wythe. Through the use of the thermal coating provided by the insulating members, the underlying metal components of the anchor obtain a lower thermal conductive value (K-value), thereby providing a high strength anchor with the benefits of thermal isolation.

Referring now to FIG. 1-3, in the application, threaded shaft section 135 integrates with the threaded wall section 138, allowing first insulating member 170 to insulate in addition to a function or assist in the functioning of second insulating member 175. The defined third insulating member 180 is configured to engage at least a portion of stud 150. In other words, first insulating member 170 is configured to reduce the transfer of energy respective to fastening end 110 and middle section 115. In one embodiment, system 100 includes a third insulating member 180 configured to be disposed on threaded shaft section 136 wherein one or more sections of thermal coating are integrated into the threaded shaft section 136, the threaded wall section associated with the threaded shaft section 136, or both. The disposing of the sections of thermal coating to threaded shaft section 136 allows for cooperation with the first insulating member resulting in an advancement of the overall reduction of transferred thermal energy accomplished by fastening end 110 of the wall anchor system 100. The third insulating member allows for the reduction of transfer of thermal energy between stud 150 and the middle section of the wall anchor.

In one embodiment, the affixing of the plurality of wings 155 may be accomplished by a threaded shaft portion 185 (see FIG. 3) that is received by a channel 181 to support a threaded connection between wings 155 and elongated shaft 105, which channel 185 may include threading configured to integrate with a threaded component of receiving end 125, of channel 185 may affix to receiving end 125 in a non-threaded arrangement. In application, the threaded portion 185 of the elongated shaft 105 is received into channel 181, including any locking or affixing mechanism applicable to tightly securing retention to elongated shaft 105, resulting in the winged body configuration. In one embodiment, channel 181 may include a threaded wall configured to have thermal coating disposed of therein and further configured to receive elongated shaft 105 through the integration of threading disposed anywhere applicable on elongated shaft 105 in order to achieve the winged configuration. In the winged configuration, the elongated shaft 105 is configured to be substantially aligned with the longitudinal axis (represented by the dotted line A). In one embodiment, wing 155 may be a planar wing configured to extend from a first side of the longitudinal axis along to a second side of the longitudinal axis. In one embodiment, the aperture wall 165 specifically houses second insulating member 175, and aperture wall 165 may further include at least one of the sections of thermal coating of the plurality of sections of the thermal coating.

The elongated shaft 105 is illustrated as being substantially aligned with the longitudinal axis (represented by the dotted line A). In one embodiment, elongated shaft 105 may include a plurality of insulating members configured to function as a thermal coating; wherein the thermal coating is also substantially aligned with the longitudinal axis. Fastening end 110 may include a drill-like portion 130 and may be configured to function as a self-drilling, screw-like, tapping, or any other applicable type of insertion method configured to fasten system 100 to a cavity wall including an outer wythe and inner wythe or any other applicable components of masonry walls. For the purpose of illustration, outer wythe and inner wythe cooperate to define a cavity configured to be associated with system 100. In one embodiment, fastening end 110 is mounted to the inner wythe via threading, nailing, or any applicable form of penetration of drill-like portion 130, and drill-like portion 130 is configured to abut a stud 150 associated with the inner wythe. In one embodiment, stud 150 abuts the outward-facing surface 123 of panel 120. In one embodiment, thermal coating 210 is configured to span the stud 150. FIG. 3 also illustrates an embodiment having an insulating member 176 that acts both a first insulating member (configured to span a least a portion of the interior of the panel when fully assembled) and a third insulating member (configured to engage at least a portion of a stud abutting the threaded shaft section) when in the fully assembled configuration.

As described in greater detail below, wall anchor system 100 is configured to provide a thermal break in a cavity allowing minimal to no penetration of air and moisture to the inner wythe. In one embodiment, system 100 may be configured to integrate thermal clips, pintle ties, thermal grip brick tie washers, or any other application component configured to seal anchor penetration and protect against air and moisture penetration while concurrently affixing insulating components referred to herewith.

In one embodiment, drill-like portion 130 includes the threaded shaft section 135 configured to integrate with the fastening end 110, allowing fastening end 110 to be mounted to the inner wythe. In one embodiment, the inner wythe may be associated with a threaded wall section configured to receive and be integrated with drill-like portion 130. Said threaded wall section might be provided by a tubular section including an open-end wherein the threaded wall section is disposed within the tubular section, and the open end is configured to receive drill-like portion 130. In one embodiment, the threaded shaft section 135 includes at least one insulating member configured to support a thermal break along the fastening end 110 and the applicable contacted surface.

In one embodiment, receiving end 125 further includes a flange section 140, a catching feature 145, and a plurality of washers or any other applicable mechanism for affixing. In one embodiment, a first washer is configured to be disposed on a downward-facing side of flange section 140 and a second washer is configured to be disposed on elongated shaft 105 upward from fastening end 110. In one embodiment, catching feature 145 is configured for receiving a tool configured to threadedly mount system 100 to inner wythe 28. The tool may be a hex head, screw, hinge, clamp, or any other applicable mechanism configured to support affixing and retaining system 100 to a suitable structure.

In application, a portion of the veneer tie is inserted within aperture 160, allowing aperture wall 165 to reduce the transfer of thermal energy associated with the veneer tie. In particular, each aperture disclosed herein is configured to have aperture wall 165 disposed of therein to define the thermal break via at least an insulating member, a section of thermal coating, and/or both. In other words, the wall anchor system 100 not only configured to provide a thermal break in a cavity associated with a masonry wall system but also utilizes the plurality of apertures 160 to provide thermal break at any location where the system comes into contact with the veneer tie. In one embodiment, flange section 140 is positioned downward respective to at least one of the plurality of apertures 160.

For the purpose of illustration, while drill-like portion 130 is in contact with stud 150, a first thermal break is provided approximately by first insulating member 170, a second thermal break is provided by the second insulating member 175 disposed along the aperture wall 165, and a third thermal break is provided by a third insulating member 180 that spans the stud 150 that contacts a portion of the inward-facing surface of the panel.

Figure 4:
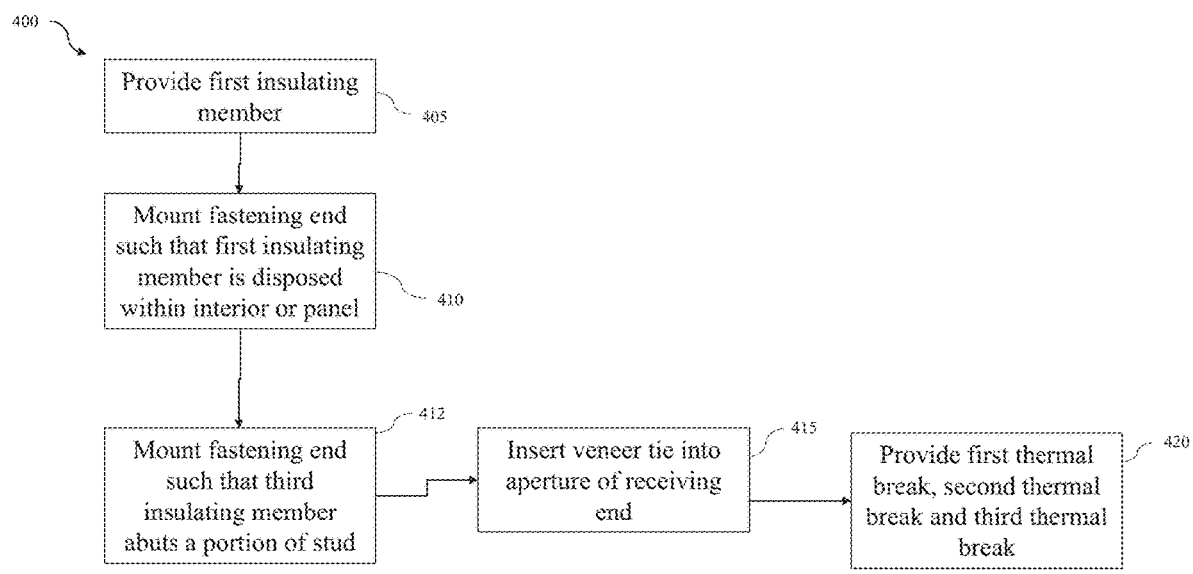
FIG. 4 is a method for utilizing the wall anchor system, according to an example embodiment; and, FIG. 5 is a perspective view of an anchoring system as applied to a cavity wall with an inner wythe of drywall construction and on outer wythe of brick.

Now referring to FIG. 4, a method 400 for utilizing wall anchor system 100 or system 400 in the cavity to connect a veneer tie that joins outer wythe and inner wythe is depicted. First, in step 405, threaded shaft section 135 of fastening end 110 is mounted to a threaded wall section 138, thereby providing a first insulating member. As mentioned above, in one embodiment, the first insulating member is provided by having threaded shaft section 135 coated with a thermal coating. In another embodiment, the first insulating member is provided by having the threaded wall section 138 covered with thermal coating 139. The first insulating member is configured to be mounted into the panel 120 such that at least a portion of the thermal coating spans the interior 215 of the panel. In other embodiments, the first insulating member is configured such that the insulating member spans the entire panel such that the panel spans over the outward-facing surface and inward-facing surface of the wallboard/dry all.

In step 410, the fastening end 125 is mounted such that the first insulating member is disposed of in an interior portion of panel 120. It is understood that in order to not damage the insulating member, holes may be required to be drilled, and components may have to be assembled prior to mounting the fastening end to panel and stud. Additionally, in step 412, the fastening end may be mounted such that the third insulating member 180 along the threaded shaft section of the fastening end section is configured to engage at least a portion of a stud 150 abutting the threaded shaft section.

Next, in step 415, a section of the veneer tie is inserted into at least one aperture 160 associated with receiving end 125 such that one section of the veneer tie abuts an inward-facing surface of aperture wall 165 including a second insulating member. Step 415 allows step 420, the first insulating member, and second insulating member to provide at least one thermal break by reducing the transfer of thermal energy by the veneer tie between outer wythe 24 and inner wythe 28.

Although the subject matter has been described in language specific to structural features and/or methodological acts, it is to be understood that the subject matter defined in the appended claims is not necessarily limited to the specific features or acts described above. Instead, the specific features and acts described above are disclosed as example forms of implementing the claims.

What is claimed is:

1. A wall anchor system for use in a cavity wall to connect to a veneer tie that joins an inner wythe and an outer wythe of the cavity wall, the wall anchor comprising:
   an elongated shaft having a first longitudinal axis, a fastening end section, a receiving end section, and a middle section between the fastening end section and the receiving end section;
   the fastening end section of the elongated shaft comprising a threaded shaft section, a tubular section having an open end, a threaded wall section within the tubular section, the threaded wall section configured and arranged to mate with the threaded shaft section of the fastening end section;
   a panel having an interior positioned between at least two end surfaces;
   a first insulating member spanning a least a portion of the interior of the panel, the first insulating member comprising, a first thermal coating, the first thermal coating having a first thermal coating first portion disposed on at least a portion of the threaded wall section and a first of the thermal coating second portion disposed on at least a portion of the threaded shaft section;

the receiving end section having at least one aperture defining an aperture wall for accepting at least one section of the veneer tie;

at least a second insulating member covering the aperture wall; and wherein the first insulating member and second insulating member reduce the transfer of thermal energy by the veneer tie between the inner wythe and the outer wythe.

2. The system of claim 1, wherein the system further includes a third insulating member defined by a third section of thermal coating disposed at the end of the elongated shaft engaging a stud, wherein the third insulating member defines a thermal brake between the end of the elongated shaft, the surfaces of the panel and the stud.

3. The system of claim 1, wherein the receiving end section further defines a wing body, wherein the wing body has a planar wing extending outward from a first side and a second side of the first longitudinal axis, and wherein each planar wing includes at least one said aperture having said second insulating member disposed therein.

4. The system of claim 1, wherein the receiving end section further defines:

a second threaded shaft section for receiving a wing body;

wherein the wing body has a channel having a second threaded wall section for being received by the second threaded shaft section of the receiving end section;

wherein the wing body has a wing extending outward from each side of the first longitudinal axis; and, wherein each wing body includes one said aperture having said second insulating member disposed therein.

5. The wall anchor of claim 4, wherein the second insulating member covers the aperture wall of each aperture defining a thermal break between the veneer tie that joins the inner wythe and the outer wythe of the cavity wall.

6. A wall anchor for use in a cavity wall to connect to a veneer tie that joins an inner wythe and an outer wythe of the cavity wall, the wall anchor comprising:

an elongated shaft having a first longitudinal axis, a fastening end section, a receiving end section and a middle section between the fastening end section and the receiving end section;

the fastening end section of the elongated shaft comprising a threaded shaft section, a tubular section having an open end, a threaded wall section within the tubular section, the threaded wall section configured and arranged to mate with the threaded shaft section of the fastening end section;

a first insulating member spanning a least a portion of the interior of a panel, the first insulating member comprising, a first thermal coating, the first thermal coating having a first thermal coating first portion disposed on at least a portion of the threaded wall section and a first thermal coating second portion disposed on at least a portion of the threaded shaft section;

the receiving end section having at least one aperture defining an aperture wall for accepting at least one section of the veneer tie; and, wherein the first insulating member reduces the transfer of thermal energy by the veneer tie between the inner wythe and the outer wythe.

7. The wall anchor of claim 6, wherein the receiving end section further includes at least a second insulating member defined by a second thermal coating disposed along the aperture wall.

8. The wall anchor of claim 7, wherein the receiving end section further defines a wing body, wherein the wing body has a planar wing extending outward from a first side and a second side of the first longitudinal axis, and wherein each planar wing includes at least one said aperture having said second insulating member disposed thereon.

9. The wall anchor of claim 6, wherein a third insulating member defined by a third section of thermal coating disposed at the end of the elongated shaft engaging a stud, wherein the third insulating member defines a thermal brake between the end of the elongated shaft, the surfaces of the panel and the stud.

10. The wall anchor of claim 6, wherein the receiving end section defines at least one catching feature for receiving a tool configured to threadedly mount the wall anchor to the inner wythe.

11. The wall anchor of claim 6, wherein the receiving end section defines a flanged section positioned downward from the at least one said aperture.

12. A method of using a wall anchor having a first longitudinal axis, an elongated shaft, a fastening end section, a receiving end section and at least one thermal break for use in a cavity wall to connect a veneer tie that joins an inner wythe and an outer wythe of the cavity wall, the method comprising:

providing a first insulating member by mounting a threaded shaft section of the fastening end section to the threaded wall section of the fastening end section, wherein the threaded shaft section and threaded wall section have a thermal coating disposed thereon;

mounting the fastening end such that the first insulating member is disposed in an interior portion of a panel;

inserting a section of the veneer tie into at least one aperture of the receiving end section such that one section of the veneer tie abuts an inward facing surface of a second insulating member;

mating a thermal coated threaded wall section within an open end of a tubular section of an elongated shaft of the wall anchor with a thermal coated threaded shaft section of the fastening end section of the wall anchor; and wherein the first insulating member and second insulating member provide the at least one the thermal break by reducing the transfer of thermal energy by the veneer tie between the inner wythe and the outer wythe.

13. The method of claim 12, wherein the method further includes providing a third insulting member disposed at the end of the elongated shaft section and configured to engage at least a portion of a stud abutting the panel.

* * * * *